United States Patent
Anderson et al.

(10) Patent No.: US 6,818,034 B2
(45) Date of Patent: Nov. 16, 2004

(54) DEVICE FOR SEPARATING DIRT AND DEBRIS IN FLOWING MEDIA

(75) Inventors: Gordon Anderson, Baden (CH); Joergen Ferber, Kuessaberg (DE)

(73) Assignee: Alstom Technology LTD, Baden (CH)

(*) Notice: Subject to any disclaimer, the term of this patent is extended or adjusted under 35 U.S.C. 154(b) by 0 days.

(21) Appl. No.: 10/292,492

(22) Filed: Nov. 13, 2002

(65) Prior Publication Data

US 2003/0140788 A1 Jul. 31, 2003

(30) Foreign Application Priority Data

Nov. 13, 2001 (CH) ............................................. 2083/01

(51) Int. Cl.[7] .............................................. B01D 45/12
(52) U.S. Cl. ........................... 55/349; 55/396; 55/424; 55/432; 55/457; 55/459.1; 55/385.1
(58) Field of Search ......................... 55/349, 396, 424, 55/432, 433, 457, 459.1, 385.1; 96/189; 210/512.1

(56) References Cited

U.S. PATENT DOCUMENTS

| | | | |
|---|---|---|---|
| 3,550,852 A | * 12/1970 | Schindling | ................. 239/696 |
| 3,802,570 A | 4/1974 | Dehne | |
| 3,885,935 A | * 5/1975 | Nutter | .......................... 55/457 |
| 3,895,930 A | * 7/1975 | Campolong | ................. 55/394 |
| 4,089,665 A | * 5/1978 | Brookman | ................... 55/457 |
| 5,123,945 A | 6/1992 | Lin | |
| 5,893,938 A | 4/1999 | Dyson et al. | |
| 6,083,291 A | * 7/2000 | Okada et al. | ................. 55/337 |
| 6,129,775 A | * 10/2000 | Conrad et al. | ................ 55/337 |
| 6,162,355 A | * 12/2000 | Mizuno et al. | ............. 210/168 |
| 6,428,589 B1 | * 8/2002 | Bair et al. | ..................... 55/318 |
| 6,432,154 B2 | * 8/2002 | Oh et al. | ....................... 55/423 |
| 2003/0033791 A1 | * 2/2003 | Elliott | ......................... 55/396 |

FOREIGN PATENT DOCUMENTS

| | | |
|---|---|---|
| DE | 910120612 U1 | 3/1992 |
| DE | 198 34 376 | 2/2000 |
| GB | 2199267 A | 7/1998 |
| GB | 2326360 A | 12/1998 |
| JP | 03-080955 A | 4/1991 |
| JP | 2001-179134 A | 7/2001 |

OTHER PUBLICATIONS

European Search Report for Swiss Application No. 2001 2083/01.
Search Report from DE 102 51 925.0 (Nov. 20, 2003).

* cited by examiner

*Primary Examiner*—Robert A. Hopkins
(74) *Attorney, Agent, or Firm*—Cermak & Kenealy LLP; Adam J. Cermak

(57) ABSTRACT

The present invention relates to a device for separating dirt and debris in flowing media by making use of centrifugal forces, said device comprising a separation chamber (1), and a dirt collection chamber (3) connected with said separation chamber (1) by at least one dirt discharge opening (2). Arranged in the region of dirt discharge opening (2) within dirt collection chamber (3) are one or more flow guide elements (4, 5, 6), which make the backflow of dirt and debris into separation chamber (1) difficult.

In the present device the danger of backflow of dirt and debris particles from the dirt collection chamber into the separation chamber is reduced.

16 Claims, 3 Drawing Sheets

DEVICE FOR SEPARATING DIRT AND DEBRIS IN FLOWING MEDIA

TECHNICAL FIELD OF INVENTION

The present invention relates to a device for separating dirt and debris in flowing media by making use of centrifugal forces, said device comprising a separation chamber and a dirt collection chamber connected with said separation chamber by at least one dirt discharge opening. The device is particularly suited for purifying cooling medium used to cool the parts of a fluid flow machine, such as for example, the guide vanes of a turbine plant.

Adequate and reliable cooling of the parts of a fluid flow machine is an important aspect in the operation of such a fluid flow machine. Modem, high-temperature gas turbines require a sophisticated cooling system in order to achieve a high degree of efficiency, in particular for cooling the highly stressed turbine blades. For this reason, the turbine blades are interpenetrated with cooling ducts or hollow spaces that form cooling ducts, through which a cooling medium, in particular cool air flows when the machinery is in operation. Generally, numerous cool air bores are provided on the front edge of the turbine blades in the approach flow region, through which the cooling medium is able to pass from the interior of the blades outwardly. In this region a film of cool air forms on the surface, which protects the turbine blades from excessive heat build-up. Similarly, corresponding cool air bores are also located on the back edge of the turbine blades.

In many cases the cooling medium is formed by a portion of air that is compressed by, or is conducted past, the compressor stage and is conveyed to the cooling ducts through one or more supply ducts.

A problem that presents itself during operation of such cooling systems in a fluid flow machine is the clogging of the cooling ducts or cool air bores by dirt or dust particles drawn from the outside air or from parts of the fluid flow machine disposed upstream of the cooling ducts, and which are transported with the cooling medium into the cooling ducts. The clogging of individual cooling ducts or cool air bores may result locally in substantial thermal stress to the parts being cooled, to the point of damaging them.

THE PRIOR ART

To eliminate or reduce the danger of clogging it is known to arrange separators, such as cyclones, within the cooling system for separating dirt and dust particles from the cooling medium. In these separators swirls are generated in the cooling medium by means of which the dirt and dust particles due to their inertia are separated from the cooling medium and are carried off through a separate dirt discharge opening.

The use of separators of this type in the form of an axial cyclone is described in German patent publication DE 198 34 376 A1. Here, the cool air passing from the compressor stage is conducted prior to intake by such an axial cyclone into the first guide vane of the turbine stage. The cyclone is designed internally with a swirl generator that imparts a swirl in the cool air flow, as a result of which the slower-moving dust and debris particles strike the wall of the cyclone and drop downwardly. At the bottom of the cyclone they are carried off through corresponding discharge ducts. The discharge ducts lead to areas of the gas turbine that do not react sensitively to dust, debris and moisture droplets or other impurities. For discharging dirt particles, however, a portion of the cool air is consumed which is then no longer available for the cooling of sensitive components. Such a continual loss of valuable cool air is undesirable, since as a rule the cool air is costly to compress and in a number of cases has been re-cooled outside the gas turbine. The loss of said portion of cool air negatively impacts the operating efficiency of the plant and also reduces the cooling effect on the dirt-sensitive components of the gas turbine.

To eliminate the continuous loss of cooling medium, it is also known to equip the dirt separator with a dirt collection chamber in which the separated dirt and debris particles temporarily accumulate. The dirt collection chambers may then be emptied when the plant is not in operation. An example of an embodiment of such a device for separating dirt and debris is shown in FIG. 1 in the form of a reverse cyclone. FIG. 1 shows a separation chamber 1 which generates by virtue of its conical shape a swirl flow in the cooling medium. The cooling medium to be cleaned enters tangentially into the separation chamber 1 through inlet opening 9. Within the swirl flow the dirt and debris particles entrained in the cooling medium are hurled outwardly by centrifugal force against the walls of the separation chamber, where they lose their kinetic energy due to friction with the walls, then drop through dirt discharge opening 2 to the bottom or onto the tip of the conically shaped separation chamber 1 and into the underlying dirt collection chamber 3. In the center of separation chamber 1 an upwardly directed reverse flow is formed, by means of which the purified cooling medium once again exits the device through the central outlet opening 10.

Because of the limited space inside a fluid-flow machine, effort is made to design dirt collection chamber 3 as compactly as possible. However, this may cause a relatively large portion of the particle flow entering dirt collection chamber 3 to flow back again into the separation chamber. Moreover, it is desirable if dirt separators of this type are capable of being installed in any desired position in the fluid flow machine, e.g. horizontally or upside down. Such modified positions may also cause a relatively large portion of the dirt and debris particles to exit the dirt collection chamber, and thus remain entrained in the cooling medium.

Based on the aforementioned prior art the object of the present invention is to provide a device for separating dirt and debris having a dirt collection chamber, in which the danger of backflow of dirt and debris particles from the dirt collection chamber into the separation chamber is reduced.

BRIEF DESCRIPTION OF THE INVENTION

The object is achieved with the device according to claim 1. Advantageous embodiments of the device are set forth in the dependent claims. Claims 11–14 contain additional preferred uses of the present device in a fluid flow machine.

The present device for separating dirt and debris in flowing media operates in a known manner by making use of centrifugal force. Said device has a separation chamber and a dirt collection chamber connected with the separation chamber by at least one dirt discharge opening. Arranged in the region of the dirt discharge opening within the dirt collection chamber of the present device are one or more flow guide elements, which make the backflow of dirt and debris particles into the separation chamber difficult. The flow guide elements may for example originate from the side walls of the dirt extraction chamber or from the rim of the dirt discharge opening.

It was recognized in accordance with the present invention that the arrangement of suitable flow guide elements in the region of the dirt discharge opening within the dirt collection chamber could significantly reduce the danger of backflow of dirt and debris that had been separated off. Such flow guide elements have a dual function. First, they stabilize within the dirt collection chamber a swirl flow that is generated to separate particles in the separation chamber; hence because the swirl flow is also maintained within the dirt collection chamber, the dirt and debris particles remain trapped against the sidewalls. Second, they also define a physical barrier against the backflow of separated particles into the separation chamber.

This supplemental arrangement of flow guide elements in the area of the dirt discharge opening can significantly reduce the danger of backflow of dirt and debris in relatively small dirt collection chambers as well. Moreover, devices designed in this manner are more easily mounted in fluid flow machines in different orientations, without reducing functional capacity.

In one advantageous embodiment, at least one flow guide element is supported by a conical body that tapers in the direction of the dirt discharge opening, and which projects from the side of the dirt collection chamber opposite the dirt discharge opening. The tip of said conical body protrudes into the center of the dirt discharge opening. The swirl or turbulent flow generated in the separation chamber carries over in similar manner into the dirt collection chamber. Furthermore, the central conical body forms an added physical barrier against the flow of separated dirt or debris back into the separation chamber.

In another advantageous embodiment a flow guide element in the form of a ring shaped collar extends from the rim of the dirt discharge opening into the dirt collection chamber. Thus, a particularly effective hold-back system is realized, in particular when combined with a conical interior body as provided in the aforementioned embodiment.

In yet another advantageous embodiment, a flow guide element disposed in the region of the dirt discharge opening is designed in the form of a ring composed of guide vanes that are aligned with the swirl flow formed in the separation chamber. These guide elements thus also transmit the swirl flow formed in the separation chamber into the dirt collection chamber. They may cover the entire dirt discharge opening, or they may—particularly in combination with a conically shaped interior body—cover the slot opening that remains between the interior body and the rim of the dirt discharge opening. Guide vanes of this type form an especially effective barrier against the backflow of dirt and debris from the dirt collection chamber.

Preferably, the dirt collection chamber of the present device has at least one dirt discharge duct through which accumulated dirt and debris may be carried off via a shut-off valve at set time intervals. Preferably, this duct is connected to a region of the fluid flow machine that is lower in pressure than the dirt collection chamber. Alternatively, said duct may be connected to the environment or outside air. By this means, dirt is automatically discharged when the valve is opened due to the pressure differential. The discharge of dirt is preferably carried out only at set intervals during operation of the fluid-flow machine so that the resultant loss of cooling medium is kept very minimal. In a variant mode of operation the valve is opened during shut down of the machine in order to empty the dirt collection chamber.

It is understood that for purposes of reducing the loss of cooling medium, these modes of operation can also be implemented in dirt separators which have dirt collection chambers and at least one dirt discharge duct fitted with a shut-off valve, but which have no flow guide element according to the present invention.

In a further use, multiple devices of the present kind are arranged in a fluid flow machine, and the dirt discharge ducts of all or of individual groups of dirt collection chambers are joined together and drained by way of a common valve. This facilitates the functioning and control of the valves during the emptying process.

The present device is preferably used by installing it in a gas or steam turbine plant for purifying the cooling medium, especially cool air that is conveyed to the guide vanes of the plant.

BRIEF DESCRIPTION OF THE DRAWINGS

The device of the present invention and its use are once more briefly described below with reference to preferred embodiments in connection with the drawings, but without limitation of the overall inventive concept, in which.

WAYS OF IMPLEMENTING THE INVENTION

Figure 1:
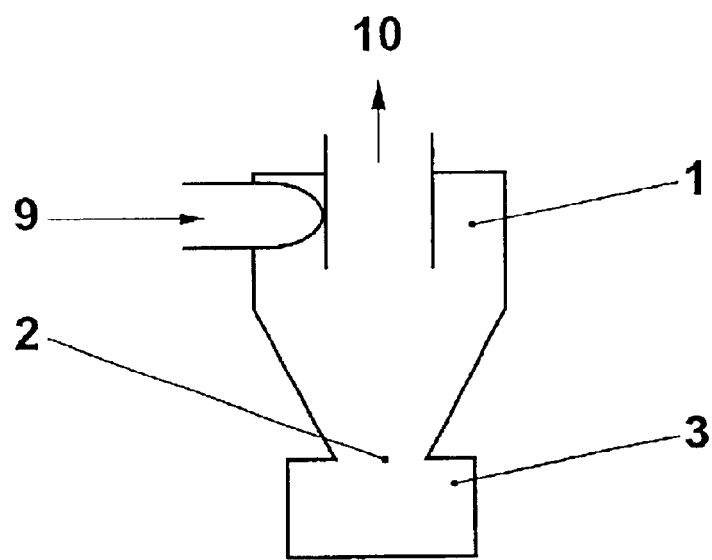
FIG. 1 is an example of a cyclone in accordance with the prior art.

FIG. 1 shows a reverse-cyclone as it is used in the prior art. The reverse-cyclone, comprising a separation chamber 1, dirt discharge opening 2, and a dirt collection chamber 3 was described above in the introduction to the present description. A flow of cooling medium entering the lateral inlet opening 9 is transformed into a swirl flow due to the conical shape of separation chamber 1, such that under centrifugal force the dirt and debris particles entrained therein strike the side walls and pass through dirt discharge opening 2 into collection chamber 3. An upwardly directed back flow is formed in the central portion of separation chamber 1 by means of which the purified cooling medium again exits the cyclone through central outlet opening 10.

Figure 2:
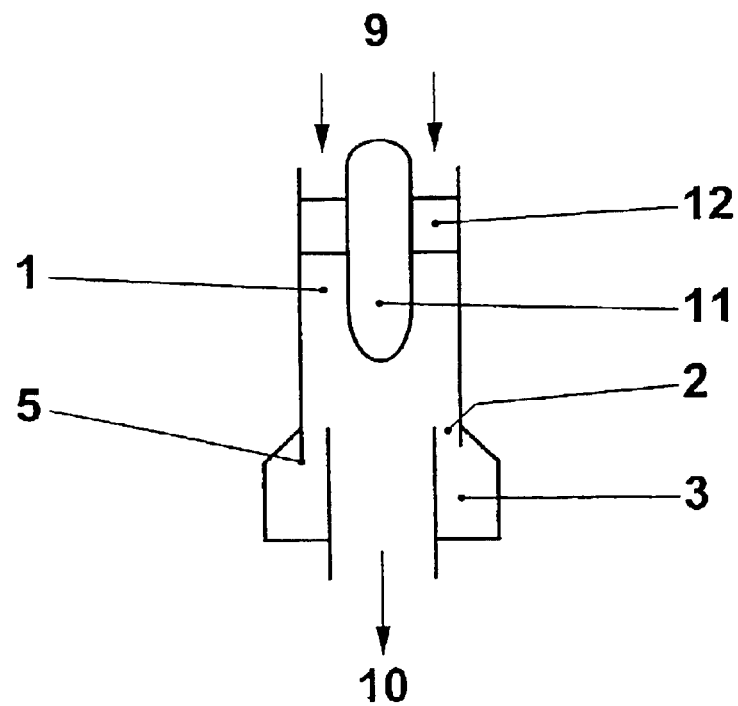
FIG. 2 is a first embodiment of a design of the present device.

FIG. 2 shows an exemplary embodiment of an axial cyclone, in which the cooling medium enters separation chamber 1 through inlet opening 9 and after passing through the separation chamber exits once again in purified form in the same direction through outlet opening 10. In this cyclone a central, rotationally symmetrical body 11 is arranged at inlet 9. Arranged between said central body 11 and the side walls of the cylindrical separation chamber 1 are flow guide vanes 12 which convert the incoming flow into a swirl flow. As a result of said swirl or turbulent flow in separation chamber 1, the entrained dirt and debris particles again strike the walls of separation chamber 1 and drop from there through dirt outlet opening 2 into dirt collection chamber 3. In this example, dirt collection chamber 3 is circular in design and surrounds separation chamber 1, in which dirt outlet opening 2 is also in the form of a ring shaped slit.

In the present embodiment a ring-shaped collar 5 extending from the edge of dirt discharge opening into dirt collection chamber 3 inhibits or greatly reduces the back flow of separated dirt and debris particles from dirt collection chamber 3 into separation chamber 1. Said collar 5, designed as a rectilinear extension of the cylindrical body of separation chamber 1, further causes the swirl flow to extend into dirt collection chamber 3.

Figure 3:
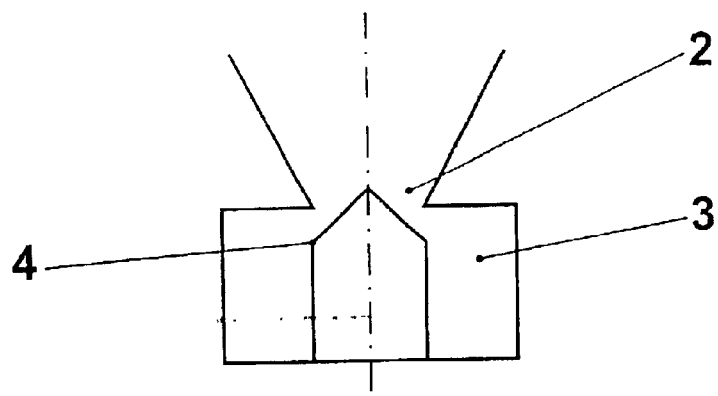
FIG. 3 is an example of the device with a conical interior body.

FIG. 3 shows an example of the device designed with a conically shaped interior body, in which here as well as in the two following examples only the lower portion of separation chamber 1 with connecting dirt collection chamber 3 is illustrated. In the example of FIG. 3 an interior body 4 with a conically shaped tip is arranged in dirt collection chamber 3, and extends into the center of the dirt discharge opening 2. Thus, on the one hand the swirl flow generated in separation chamber 1 of said cyclone is extended into dirt collection chamber 3. On the other hand said conically shaped interior body 4 creates a physical barrier against the backflow of dirt or debris from dirt collection chamber 3.

Figure 4:
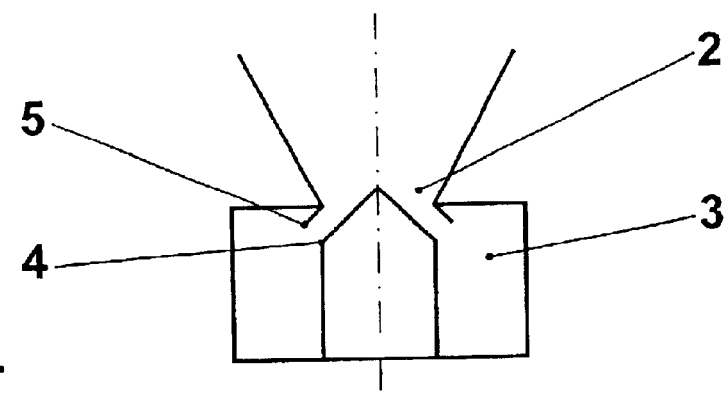
FIG. 4 is a second embodiment for a design of the present device.

A further modification of the design in FIG. 3 according to the present invention is shown in FIG. 4, in which a ring shaped collar 5 extends from the rim of dirt discharge opening 2 into dirt collection chamber 3. The contour of collar 5 is aligned with the conical shaped contour of interior body 4 to form a ring-like slot with opposing surfaces disposed approximately parallel to one another, as can be seen in FIG. 4. Collar 5 further reduces the risk of dirt exiting from dirt collection chamber 3 into separation chamber 1.

Figure 5:
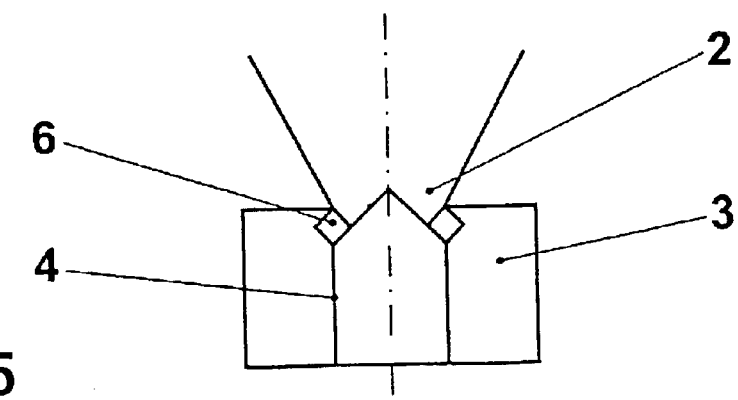
FIG. 5 is a third embodiment for a design of the present device.

FIG. 5 is a further embodiment of the present device, in which a ring of guide vanes 6 is formed between a conical interior body 4 within the dirt collection chamber 3 and the rim of the dirt discharge opening 2. The guide vanes are oriented so that the swirl flow generated in separation chamber 1 extends unimpeded into dirt extraction chamber 3 and is stabilized therein.

Figure 6:
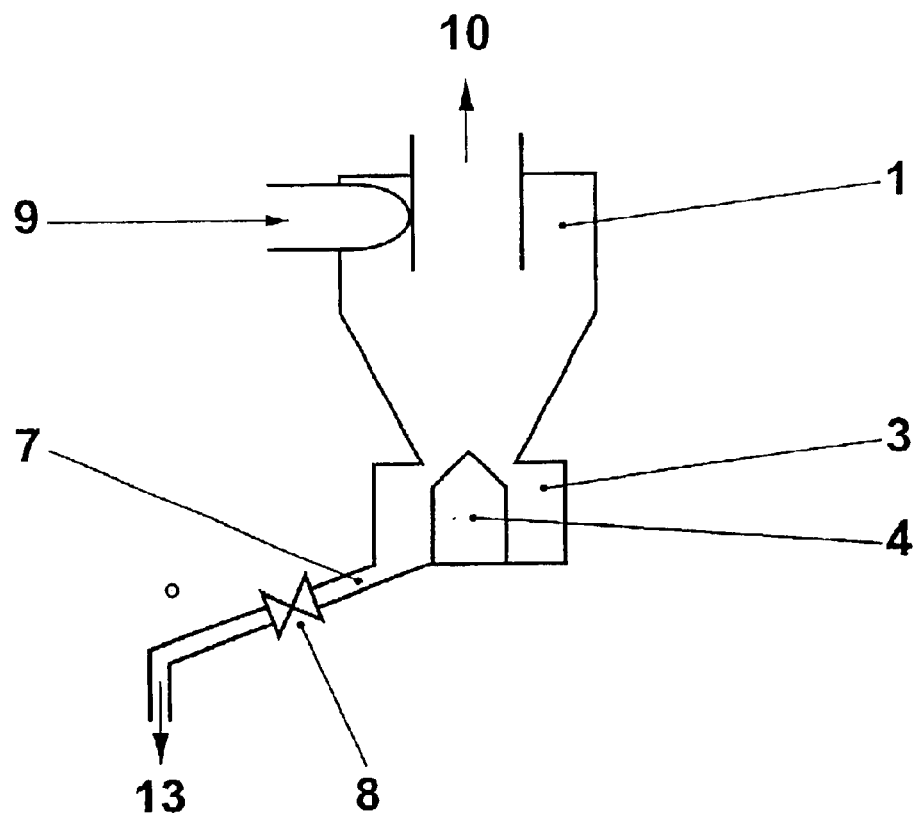
FIG. 6 is a fourth embodiment for a design of the present device.

FIG. 6 shows yet another embodiment of the present device, in which a conical shaped body 4 is arranged in dirt collection chamber 3 just as in the embodiment shown in FIG. 3. The flow guide element arranged in accordance with the present invention has been omitted in this simplified illustration. In the embodiment according to FIG. 6 dirt collection chamber 3 has a dirt discharge duct 7 which is opened and closed by a valve 8. Said dirt discharge duct 7 is preferably connected with a region 13, such as a fluid flow machine, in which the pressure is lower than in dirt collection chamber 3. Said region 13 may e.g. be in the form of an ring-like slot between a heat shield and a guide vane or a boroscopic opening in a guide vane. Valve 8 is preferably regulated to open and close in a predetermined manner to ensure that during plant operation dirt and cooling medium are not constantly discharged from dirt collection chamber 3 via said discharge duct 7. Discharging dirt for purposes of emptying dirt collection chamber 3 requires only a fraction of the plant's total operating time, thus the process of discharging debris through dirt discharge duct 7 and valve 8 consumes only a very small amount of cooling medium. It is preferable if dirt is discharged or dirt collection chamber 3 is emptied only when the plant is completely shut down.

Figure 7:
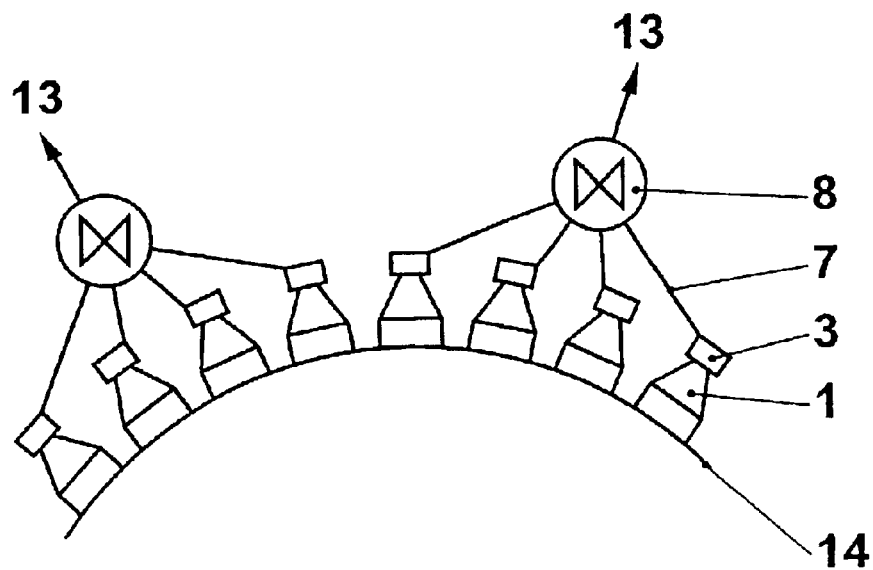
FIG. 7 is an example of a use of the present device.

FIG. 7 shows yet another possible use of the present invention in a fluid flow machine. In this case a plurality of such devices are arranged on a suitable support 14 of the fluid-flow machine. Groups of dirt collection chambers 3 of said devices are connected with their respective dirt discharge ducts 7 and are emptied through a common valve 8. In this example as well dirt discharge ducts 7 are connected with a region 13 of low pressure. Emptying multiple dirt separation devices has the advantage of reducing the costs of such a discharge system. For example, for every guide vane in each row of guide vanes in a turbine having a dirt separation device, it is feasible to provide a discharge system with a valve 8, at which point the dirt discharge ducts 7 of said devices converge.

It is understood that the various design details illustrated in the embodiments above may be combined with one another in any desirable manner. Further, it is of course also feasible to install, aside from the dirt separators illustrated in the figures, other separator devices that operate on the principle of centrifugal force in accordance with the present invention.

List of Reference Numerals

1 Separation chamber
2 Dirt discharge opening
3 Dirt collection chamber
4 Conical interior body
5 Ring shaped collar
6 Guide vane ring
7 Dirt discharge duct
8 Valve
9 Inlet opening
10 Outlet opening
11 Interior body
12 Guide vane ring
13 Region of low pressure
14 Support

What is claimed is:

1. A device for separating dirt and debris in flowing media by making use of centrifugal force, the device comprising:
   a separation chamber, at least one dirt discharge opening, and a dirt disposal chamber connected with the separation chamber by the at least one dirt discharge opening; and
   at least one flow guide element arranged adjacent to the dirt discharge opening and within the dirt disposal chamber, the at least one flow guide element inhibiting the backflow of disposed dirt and debris from the disposal chamber into the separation chamber;
   wherein the at least one flow guide element comprises a conically shaped body arranged within the disposal chamber that tapers in the direction of the discharge opening.

2. A device according to claim 1, wherein the at least one discharge opening comprises a rim, and wherein the at least one flow guide element comprises an annular collar that extends from the rim of the at least one discharge opening into the disposal chamber.

3. A device according to claim 1, wherein the separation chamber comprises a portion which is conically or frusto-conically shaped and tapers toward the discharge opening.

4. A device according to claim 1, wherein said device comprises a reverse cyclone.

5. A device according to claim 1, wherein said device comprises an axial cyclone.

6. A device according to claim 5, wherein the disposal chamber comprises an annular chamber surrounding the separation chamber.

7. A device according to claim 1, wherein the disposal chamber comprises a blockable discharge line.

8. A device according to claim 1, wherein the conically shaped body supports the at least one flow guide element.

9. A method of purifying a cooling medium in a fluid flow machine, the method comprising:
providing a device according to claim 10;
flowing cooling medium from the fluid flow machine into said device;
connecting the blockable discharge line with a region of the fluid flow machine that is lower in pressure than the disuosal chamber during operation;
cyclically opening the blockable discharge line, thereby emptying the disposal chamber; and discharging the collected dirt into the fluid flow machine.

10. A method according to claim 1, comprising:
arranging multiple devices with dirt collection chambers that each include a dirt discharge duct in the fluid flow machine, wherein the dirt discharge ducts from at least two of the dirt collection chambers converge and are simultaneously emptied through a common valve.

11. A device according to claim 7, further comprising: a valve positioned to control flow through said blockable discharge line.

12. A fluid flow machine, comprising:
a coolant line including air entrained with dirt and debris; and
a device according to claim 1 in flow communication with the coolant line and arranged for the purification of the cool air.

13. A fluid flow machine in accordance with claim 12, wherein the disposal chamber comprises a blockable discharge line which is connected to a portion of the fluid flow machine which, during operation, has a lower pressure than the disposal chamber.

14. A method in accordance with claim 13, wherein cyclically opening comprises operating a valve to cyclically open the blockable discharge line.

15. A device for separating dirt and debris in flowing media by making use of centrifugal force, the device comprising:
a separation chamber, at least one dirt discharge opening, and a dirt disposal chamber connected with the separation chamber by the at least one dirt discharge opening; and
at least one flow guide element arranged adjacent to the dirt discharge opening and within the dirt disposal chamber, the at least one flow guide element inhibiting the backflow of disposed dirt and debris from the disposal chamber into the separation chamber;
wherein the at least one flow guide element comprises a plurality of guide vanes.

16. A device according to claim 15, wherein the plurality of guide vances are arranged in a ring.

* * * * *